(12) United States Patent
Higuchi et al.

(10) Patent No.: US 6,474,686 B1
(45) Date of Patent: Nov. 5, 2002

(54) AIR BAG DEVICE

(75) Inventors: Hitoshi Higuchi, Wako (JP); Takeru Otsuka, Wako (JP); Koichi Kamiji, Wako (JP); Nobuyuki Kawamura, Wako (JP); Masae Sato, Wako (JP); Kenichi Saito, Wako (JP)

(73) Assignee: HOnda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/859,890

(22) Filed: May 17, 2001

(30) Foreign Application Priority Data

May 29, 2000 (JP) ........................................ 2000-158300

(51) Int. Cl.<sup>7</sup> .............................................. B60R 21/22
(52) U.S. Cl. .................... 280/743.1; 280/731
(58) Field of Search .............................. 280/728.3, 731, 280/732, 743.1, 743.2

(56) References Cited

U.S. PATENT DOCUMENTS

| | | | | |
|---|---|---|---|---|
| 4,148,503 A | * | 4/1979 | Shiratori et al. | |
| 5,160,164 A | * | 11/1992 | Fischer et al. | 280/743 |
| 5,348,343 A | * | 9/1994 | Hawthorn | |
| 5,364,124 A | * | 11/1994 | Donegan et al. | |
| 5,447,329 A | * | 9/1995 | Hamada | |
| 5,452,913 A | * | 9/1995 | Hansen et al. | |
| 5,560,648 A | | 10/1996 | Rhule et al. | |
| 5,588,674 A | * | 12/1996 | Yoshimura et al. | |
| 5,613,698 A | * | 3/1997 | Patercsak et al. | |
| 5,630,614 A | | 5/1997 | Conlee et al. | |
| 6,131,944 A | * | 10/2000 | Henkel et al. | |

FOREIGN PATENT DOCUMENTS

| | | |
|---|---|---|
| DE | 29711679 U1 | 12/1997 |
| EP | 0705737 A1 | 4/1996 |
| EP | 0963886 A2 | 12/1999 |
| WO | WO97/42061 | 11/1997 |

* cited by examiner

*Primary Examiner*—Avraham Lerner
(74) *Attorney, Agent, or Firm*—Carrier, Blackman & Associates, P.C.; Joseph P. Carrier; William D. Blackman (57) ABSTRACT

A folded-up air bag is accommodated in a module cover of a steering wheel, and a peripheral edge of an opening in the air bag is fixed to a retainer supporting an inflator. The folded-up air bag is covered from a rear side of a vehicle to a front side of the vehicle by a deployment-limiting sheet disposed along an inner surface of the module cover and fixed at one end thereof to the retainer. The deployment-limiting sheet is longer than a length of an inner periphery of the module cover in a longitudinal direction of the vehicle body. Thus, it is possible to inhibit the air bag from being expanded rearwards of the vehicle body at an initial stage of deployment by the deployment-limiting sheet, thereby avoiding the early interference with an occupant.

20 Claims, 11 Drawing Sheets

AIR BAG DEVICE

BACKGROUND OF THE INVENTION

1. Technical Field to which the Invention Belongs

The present invention relates to an air bag device designed so that an air bag thereof is deployed into an occupant compartment of a vehicle by a gas generated by an inflator upon collision of the vehicle to restrain an occupant.

2. Description of Related Art

When an air bag is deployed into a vehicle compartment by a gas generated by an inflator upon collision of a vehicle, the air bag having a smaller volume at an initial stage of the deployment is expanded quickly, while the air bag having larger volume at a late stage of the deployment is expanded slowly. In addition, the air bag breaks a fragile portion of a lid in the course of the expansion to deploy into the vehicle compartment, and for this reason the air bag may expand suddenly into the vehicle compartment the moment it breaks the lid, in some cases.

Therefore, when the distance between an occupant and the air bag device is small, the following problem may be encountered: the air bag expanded at a high speed at the initial stage of the deployment may interfere with the occupant, thereby making it difficult to restrain the occupant softly. Therefore, it is a conventional practice to elaborate the manner in which the air bag is folded, so that the air bag is expanded essentially upwards at the initial stage of the deployment, thereby avoiding the interference with an occupant disposed in the rear of the air bag.

In the above conventional method, however, the direction of expansion of the air bag is not stabilized due to delicate differences in precisely how the air bag is folded, and it is difficult to reliably avoid the early interference of the air bag with the occupant.

SUMMARY OF THE INVENTION

The present invention has been accomplished with the above circumstance in view, and it is an object of the present invention to ensure that the air bag expanded at a high speed at the initial stage of the deployment does not unduly interfere with an occupant or a child seat.

To achieve the above object, according to a first aspect and feature of the present invention, there is provided an air bag device for a vehicle, comprising: a folded-up air bag accommodated in a module cover of a steering wheel; a peripheral edge of an opening in the air bag being fixed to a retainer supporting an inflator so that when the air bag is expanded by a gas generated by the inflator, the air bag is deployed into an occupant compartment of the vehicle through an opening in a lid provided on the module cover; and     a band-shaped deployment-limiting sheet disposed between the folded-up air bag and an inner surface of the module cover, and which is longer than a length of an inner periphery of the module cover in a longitudinal direction of the vehicle;

the folded-up air bag being covered from a rear side of the vehicle to a front side of the vehicle by the deployment-limiting sheet.

With the above arrangement, the folded-up air bag is covered from the rear side of the vehicle to the front side of the vehicle by the deployment-limiting sheet disposed between the folded-up air bag and the inner surface of the module cover. Therefore, the air bag deployed at the initial stage can be inhibited from being expanded rearwards of the vehicle by the deployment-limiting sheet, thereby reliably avoiding the early interference of the air bag with an occupant. Particularly, the deployment-limiting sheet is longer than the length of the inner periphery of the module cover in the longitudinal direction of the vehicle body and hence, it is possible to reliably inhibit the air bag at the initial state of the deployment from being expanded rearwards of the vehicle body.

According to a second aspect and feature of the present invention, there is provided an air bag device for a vehicle, comprising: a folded-up air bag accommodated in a retainer disposed within a dash board of the vehicle; a peripheral edge of an opening in the air bag being fixed to a retainer so that when the air bag is expanded by a gas generated by an inflator supported on the retainer, the air bag is deployed into an occupant compartment of the vehicle through an opening in a lid provided on the dash board, the folded-up air bag being covered from a rear side of the vehicle to a front side of the vehicle by a deployment-limiting sheet disposed between the folded-up air bag and an inner surface of the lid, and which is longer than a reference length; the reference length being as long as an arc of a circle which has a center immediately above a first reference point at a rear end of the lid, passes through said first reference point and which is tangent at a second reference point to a front windshield of the vehicle, the arc extending on the rear side of the vehicle between the first and second reference points.

With the above arrangement, the folded-up air bag is covered from the rear side of the vehicle to the front side of the vehicle by the deployment-limiting sheet disposed between the folded-up air bag and the inner surface of the lid. Therefore, the air bag deployed at the initial stage can be inhibited from being expanded rearwards of the vehicle by the deployment-limiting sheet, thereby reliably avoiding the early interference of the air bag with an occupant. Particularly, the deployment-limiting sheet is longer than the length of the arc of the circle which has its center immediately above the first reference point at the rear end of the lid, passes through the first reference point, and which is tangent at the second reference pointy to the front glass, the arc extending on the rear side of the vehicle body between the first and second reference points. Therefore, it is possible to reliably inhibit the air bag at the initial stage of the deployment from being expanded rearwards of the vehicle body.

DETAILED DESCRIPTION OF EMBODIMENTS OF THE INVENTION

The mode for carrying out the present invention will now be described by way of embodiments of the present invention shown in the accompanying drawings.

Figure 1:
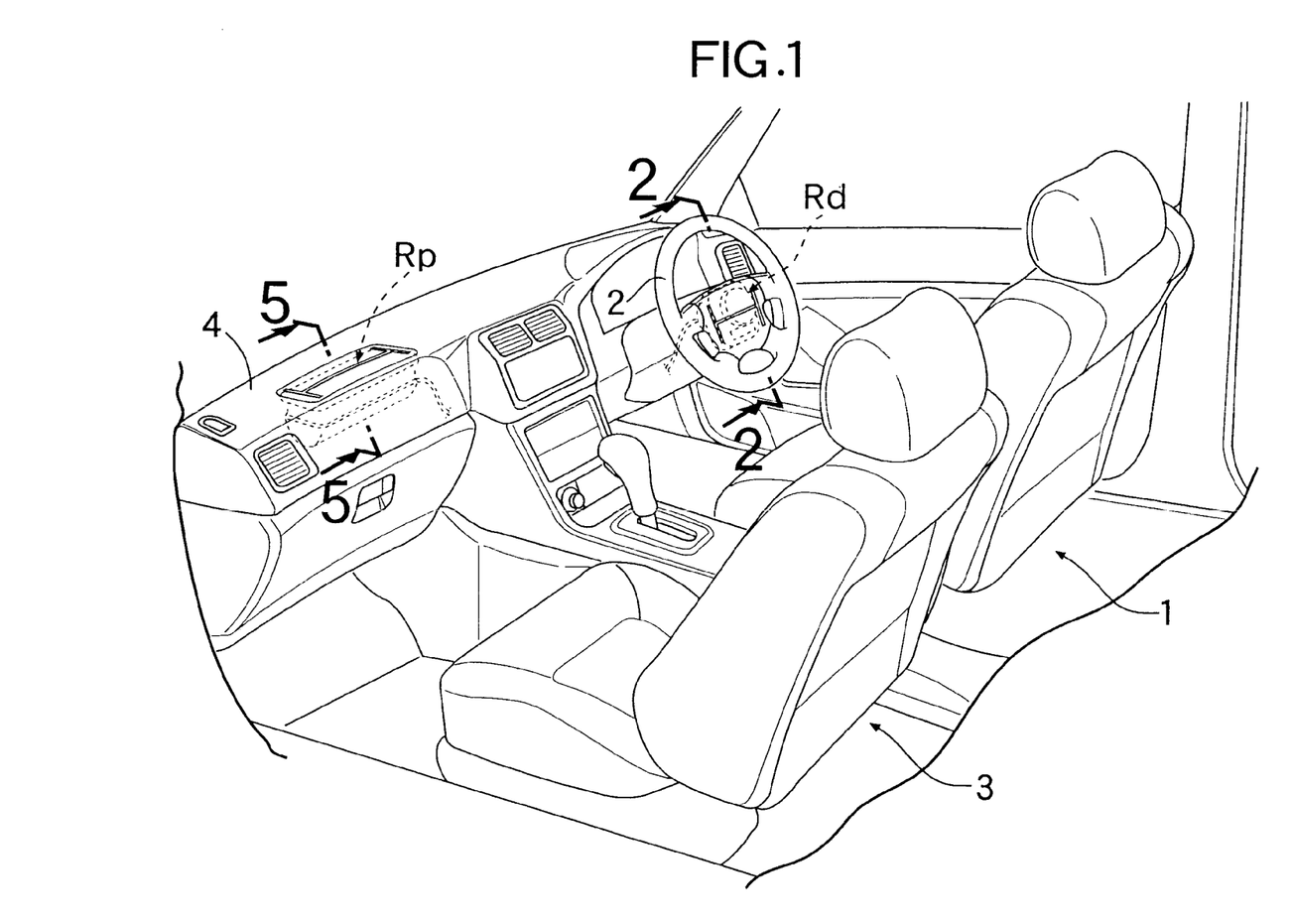
FIG. 1 is a perspective view of a front portion of an occupant compartment of an automobile.
Figure 2:
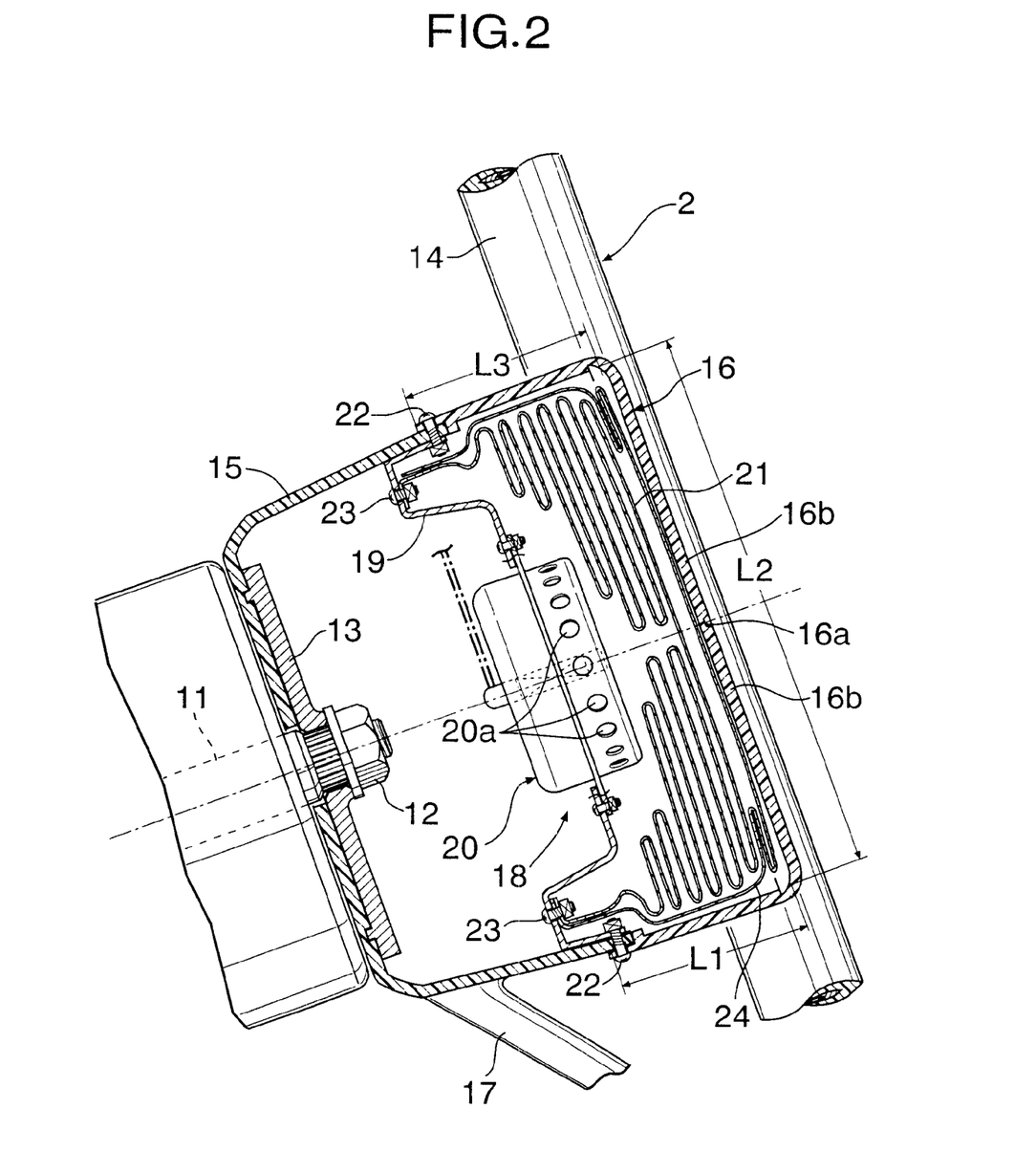
FIG. 2 is an enlarged sectional view taken along a line 2—2 in FIG. 1.
Figure 3:
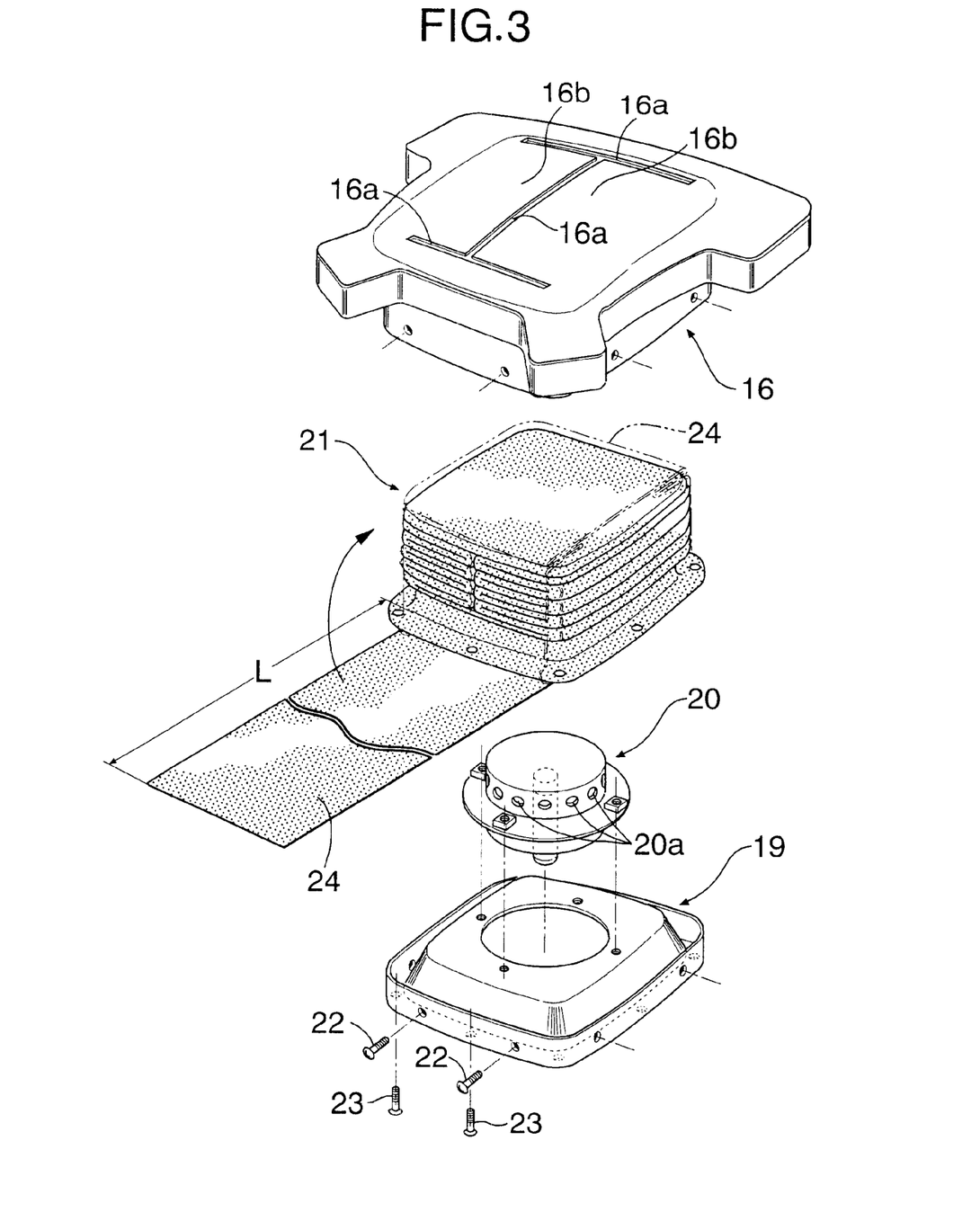
FIG. 3 is an exploded perspective view of an air bag device for a driver's seat.
Figure 4:
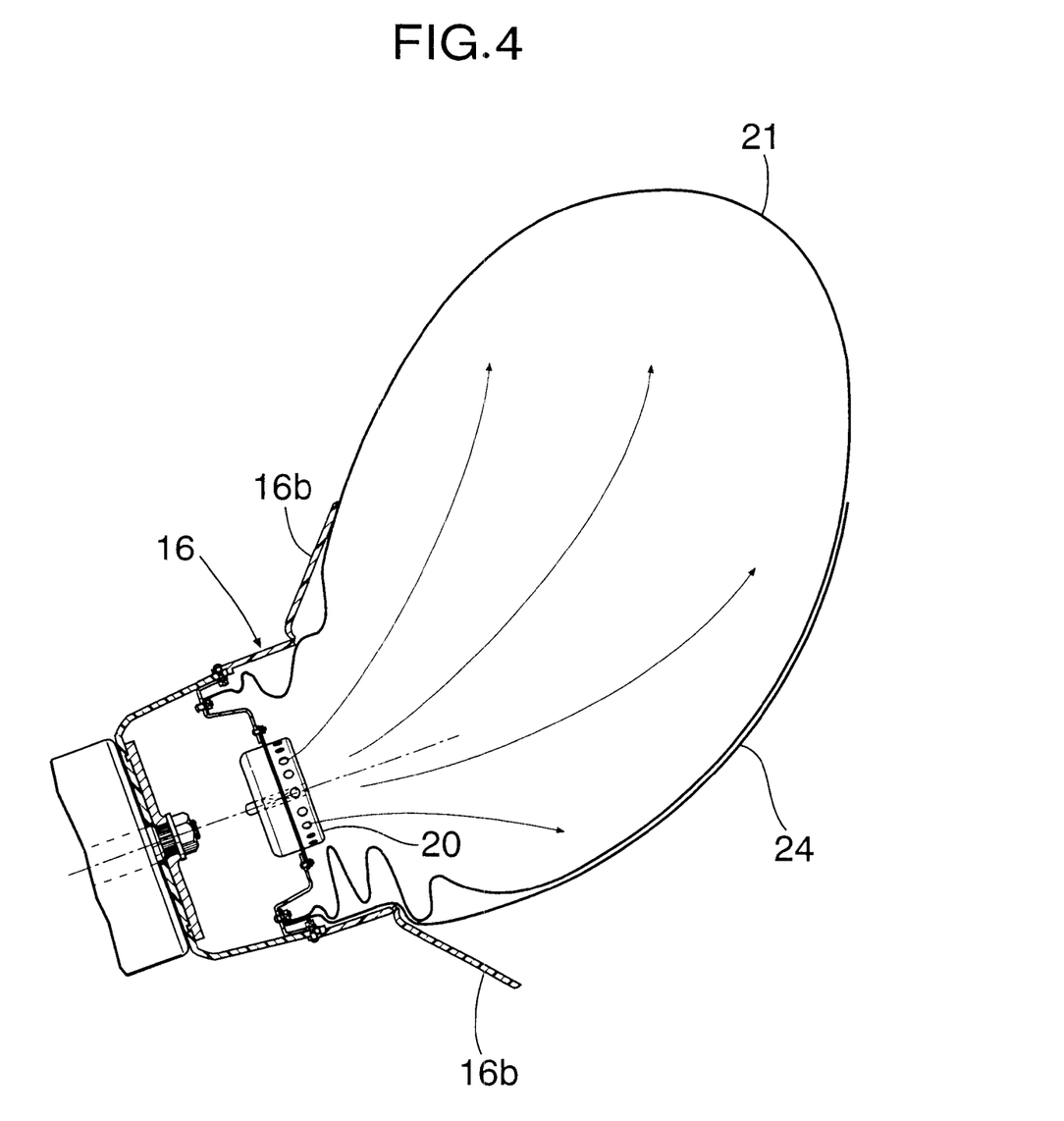
FIG. 4 is a view for explaining the operation at an initial stage of the deployment of the air bag device for the driver's seat.
Figure 5:
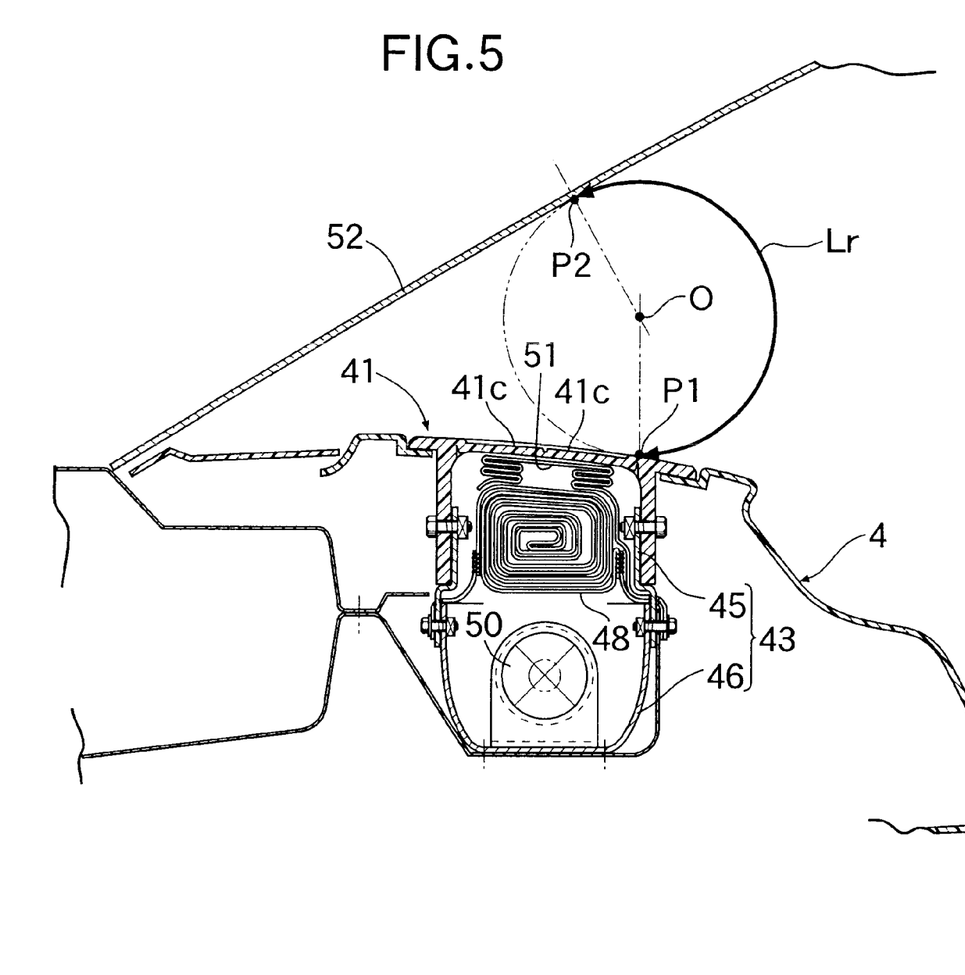
FIG. 5 is an enlarged sectional view of an air bag device for a front passenger's seat taken along a line 5—5 in FIG. 1.
Figure 6:
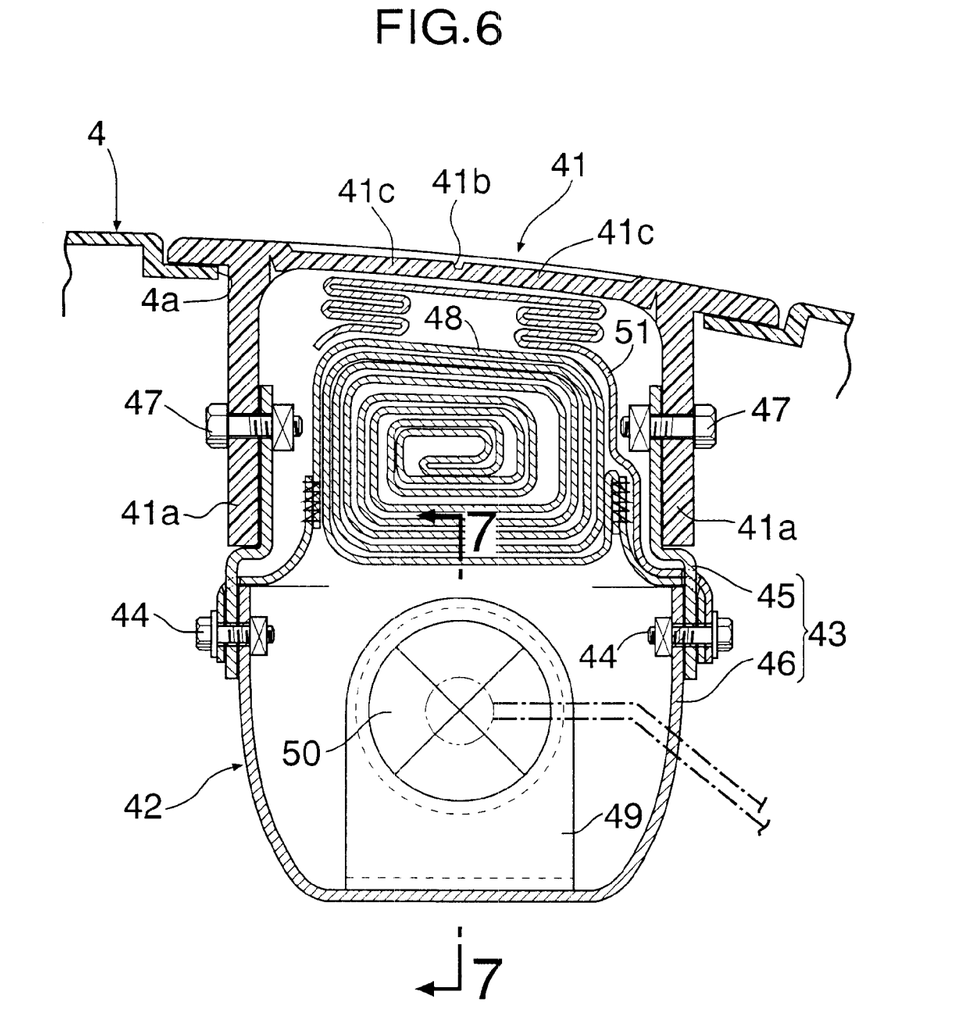
FIG. 6 is an enlarged view of an essential portion of the air bag device shown in FIG. 5.
Figure 7:
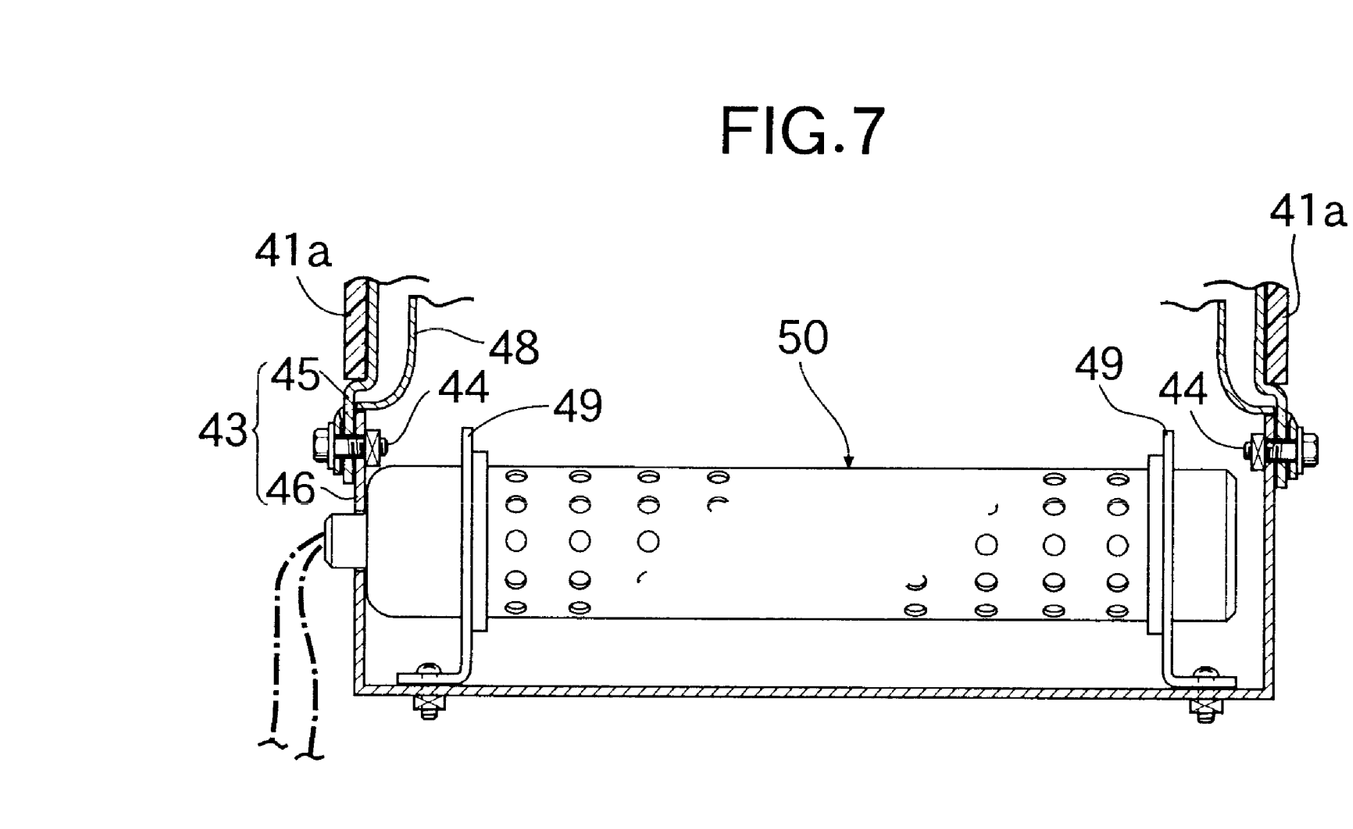
FIG. 7 is a sectional view taken along a line 7—7 in FIG. 6.
Figure 8:
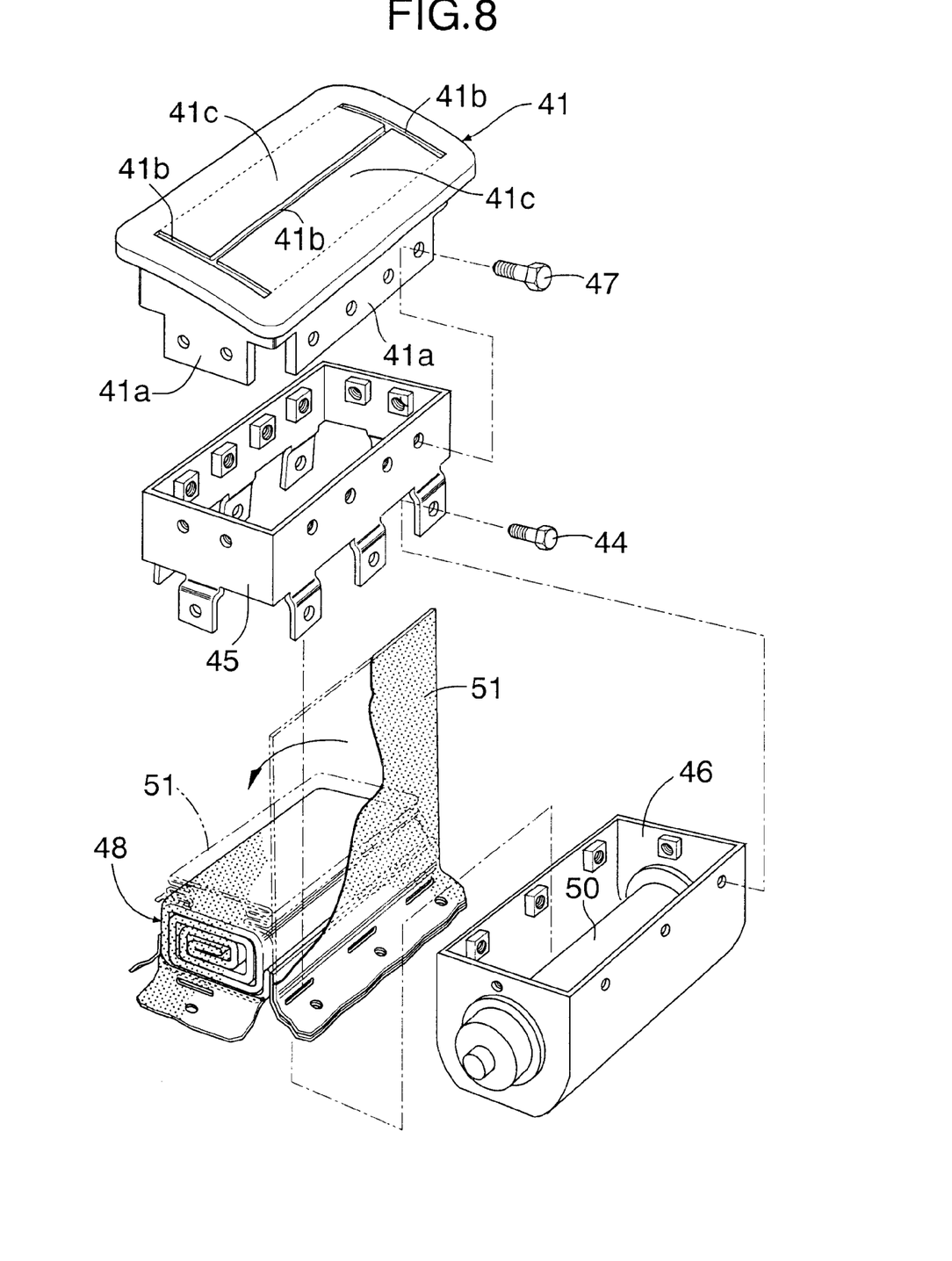
FIG. 8 is an exploded perspective view of the air bag device for the front passenger's seat.
Figure 9:
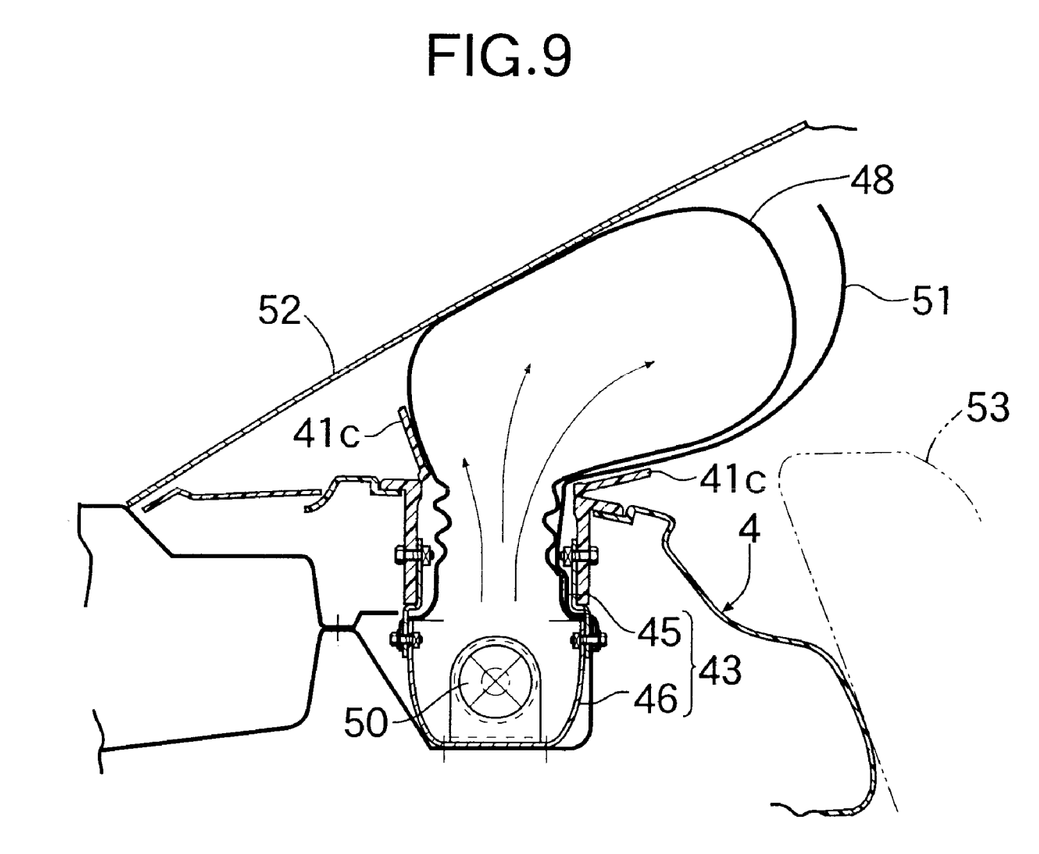
FIG. 9 is a view for explaining the operation at an initial stage of the deployment of the air bag device for the front passenger's seat.

FIGS. 1 to 9 show a first embodiment, of the present invention, including two air bag devices which are respectively associated with a driver's seat and a front passenger's seat of a vehicle. FIG. 1 is a perspective view of a front portion of an occupant compartment in an automobile; FIG. 2 is an enlarged sectional view taken along a line 2—2 in FIG. 1; FIG. 3 is an exploded perspective view of an air bag device for a driver's seat; FIG. 4 is a view for explaining the operation at an initial stage of the deployment of the air bag device for the driver's seat; FIG. 5 is an enlarged sectional view of an air bag device for a front passenger's seat taken along a line 5—5 in FIG. 1; FIG. 6 is an enlarged view of an essential portion of the air bag device shown in FIG. 5; FIG. 7 is a sectional view taken along a line 7—7 in FIG. 6; FIG. 8 is an exploded perspective view of the air bag device for a front passenger's seat; and FIG. 9 is a view for explaining the operation at an initial stage of the deployment of the air bag device for the front passenger's seat.

As shown in FIG. 1, an air bag device Rd for a driver's seat 1 is mounted at a central portion of a steering wheel 2 disposed in front of the driver's seat 1, and an air bag device Rp for a front passenger's seat 3 is mounted at an upper portion of a dash board 4 disposed in front of the front passenger's seat 3.

The structure of the air bag device Rd for the driver's seat will be described below with reference to FIGS. 2 and 3.

The steering wheel 2 includes a steering boss 13 relatively non-rotatably fitted over a rear end of a steering shaft 11 and fixed by a nut 12, an annular wheel rim 14 disposed to surround the steering boss 13, a front module cover 15 fixed to the steering boss 13, a rear module cover 16 coupled to the front module cover 15, and a plurality of spokes 17 which connect the front module cover 15 to the wheel rim 14. An air bag module 18 is accommodated in a space surrounded by the front module cover 15 and the rear module cover 16. A thin tear line 16a is defined into an H-shape in the rear module cover 16, so that a pair of lids 16b, 16b are partitioned by the tear line 16a.

The air bag module 18 is comprised of a retainer 19 for supporting the air bag module 18 within the rear module cover 16, an inflator 20 adapted to generate a high-pressure gas, and an air bag 21 adapted to be expanded by the high-pressure gas generated by the inflator 20. The retainer 19 supporting the inflator 20 at its central portion is fastened by a plurality of bolts 22 with its periphery superposed onto coupled portions of the front module cover 15 and the rear module cover 16. The air bag 21 is fixed to the retainer 19 by a plurality of bolts 23, with a peripheral edge of an opening in the air bag 21 being superposed onto an inner side of the outer periphery of the retainer 19. Gas ejection bores 20a in the inflator 20 open into an internal space in the air bag 21.

A band-shaped deployment-limiting sheet 24 formed of the same material as the air bag 21 is disposed in a folded-up state between the folded-up air bag 21 and an inner surface of the substantially cap-shaped rear module cover 16. The deployment-limiting sheet 24 is fastened at a stationary end thereof along a lower edge of the retainer 19 by the bolts 23 for fixing the peripheral edge of the opening in the air bag 21. Therefore, the deployment-limiting sheet 24 extends forwards from the rear side in a longitudinal direction of a vehicle body along the inner surface of the rear module cover 16 to cover the folded-up air bag 21, with a free end of the sheet 24 reaching near an upper edge of the retainer 19. The deployment-limiting sheet 24 is folded up in a bellows-shape in the longitudinal direction of the vehicle body. The deployment-limiting sheet 24 has a length L (see FIG. 3) set longer than a length L1+L2+L3 (see FIG. 2) of an inner periphery of the rear module cover 16 in the longitudinal direction of the vehicle body.

When an acceleration equal to or larger than a predetermined value occurs upon collision of the vehicle, the inflator 20 is ignited, and the air bag 21 expanded by the gas generated by the inflator 20 breaks the thin tear line 16a (see FIG. 3) defined in the H-shape in the rear module cover 16 and deploys into the vehicle compartment. At this time, the deployment-limiting sheet 24 covers the folded-up air bag 21 from the rear side to the front side. Therefore, a front portion (a portion farther from an occupant) of the air bag 21 faced by the free end of the deployment-limiting sheet 24 is first deployed, and a rear portion (a portion nearer to the occupant) of the air bag 21 faced by the stationary end of the deployment-limiting sheet 24 is then deployed, later than the front portion, due to a resisting force received from the deployment-limiting sheet 24 (see FIG. 4).

Therefore, even if the air bag device Rd for the driver's seat is operated with an occupant's body disposed close to the steering wheel 2, the air bag 21 deployed at a high speed of expansion at an initial stage of the deployment is expanded upwards and hence, is unlikely to excessively interfere with the occupant. Thus, the air bag 21 can restrain the occupant properly and softly, after being deployed sufficiently, due to its reduced expansion speed in a rear direction. In addition, the air bag 21 is wrapped in the deployment-limiting sheet 24 at the initial stage of the deployment and hence, vibration of the air bag 21 is inhibited, whereby the air bag 21 can be deployed smoothly. Such effect can be reliably exhibited by setting the entire length L of the deployment-limiting sheet 24 at the above-described value.

The structure of the air bag device Rp for the front passenger's seat will be described below with reference to FIGS. 5 to 9.

A retainer 43 of an air bag module 42 is fixed to support portions 41a extending downwards from a module cover 41 fixed in an opening 4a defined in an upper surface of the dash board 4. The retainer 43 is comprised of an upper retainer element 45 and a lower retainer element 46, which are fixed to each other by a plurality of bolts 44. The upper retainer element 45 is fixed to the support portions 41a of the module cover 41 by a plurality of bolts 47. A peripheral edge of an opening in an air bag 48 is sandwiched between and fastened to coupled portions of the upper and lower retainer elements 45 and 46 by the bolts 47. The module cover 41 includes a pair of lids 41c, 41c each having three sides surrounded by a thin tear line 41b adapted to be broken upon the expansion of the air bag 48. A cylindrical inflator 50 is supported on a bottom of the lower retainer member 46 through a pair of mounting brackets 49, 49.

A band-shaped deployment-limiting sheet 51 formed of the same material as the air bag 48 is disposed in a folded-up state between the folded-up air bag 48 and an inner surface of the module cover 41. The deployment-limiting sheet 51 is fastened at a stationary end thereof along a rear end of the retainer 43 by the bolts 44 for fixing the peripheral edge of the opening in the air bag 48. Therefore, the deployment-limiting sheet 51 extends forwards from a rear side in the longitudinal direction of the vehicle body along the inner surface of the module cover 41 to cover the folded-up air bag 48, with a free end of the sheet 51 reaching near a front edge of the air bag 48. The deployment-limiting sheet 51 has a length L set longer than a reference length Lr, which will be described below. In FIG. 5, a circle is depicted, which has a center O immediately above a first reference point P1 at rear ends of the lids 41c, 41c, passes through the reference point P1, and is tangent at a second reference point P2 to a front windshield 52. A length of an arc indicated by a thick line on the rear side of the vehicle body between the first and second reference points P1 and P2 is defined as the reference length Lr.

When an acceleration equal to or larger than a predetermined value occurs upon collision of the vehicle, the inflator 50 is ignited, and the air bag 48 expanded by a gas generated by the inflator 50 breaks the thin tear line 16b defined in the H-shape on the module cover 41 and deploys into the vehicle compartment. At this time, the deployment-limiting sheet 51 covers the folded-up air bag 48 on the front side thereof extending from the rear side. Therefore, a front portion (a portion closer to the front glass 52) of the air bag 48 faced by the free end of the deployment-limiting sheet 51 is first deployed, and a rear portion (a portion farther from the front glass 52) of the air bag 48 faced by the stationary end of the deployment-limiting sheet 51 is then deployed, later than the front portion, due to a resisting force received from the deployment-limiting sheet 51 (see FIG. 9).

Thus, even if the air bag device Rp is operated with a child seat 53 mounted to face backwards on the front passenger's seat 3, or with an occupant's body disposed close to the dash board 4, it can be ensured that the air bag 48 deployed at a high speed of expansion at an initial stage of the deployment is not likely to excessively interfere with the occupant. The air bag 48 is wrapped in the deployment-limiting sheet 51 at the initial stage of the deployment and hence, vibration of the air bag 48 is inhibited, whereby the air bag 48 can be deployed smoothly. Also, even when the air bag 48 interferes with the child seat 53, the air bag 48 is slipped along the deployment-limiting sheet 51 interposed between the air bag 48 and the child seat 53 and hence, a load applied to the child seat 53 can be alleviated. Such effect can be reliably exhibited by setting the entire length L of the deployment-limiting sheet 51 at the above-described value.

As discussed above, according to one aspect of the present invention, the folded-up air bag is covered from the rear side of the vehicle to the front side of the vehicle by the deployment-limiting sheet disposed between the folded-up air bag and the inner surface of the module cover. Therefore, the air bag deployed at the initial stage can be inhibited from being expanded rearwards of the vehicle by the deployment-limiting sheet, thereby reliably avoiding the early interference of the air bag with an occupant. Particularly, because the deployment-limiting sheet is longer than the length of the inner periphery of the module cover in the longitudinal direction of the vehicle body, it is possible to reliably inhibit the air bag from being expanded rearwards of the vehicle body at the initial state of the deployment.

Additionally, according to another. aspect of the present invention, the deployment-limiting sheet is longer than the length of the arc of the circle which has the center immediately above the first reference point at the rear end of the lid, passes through the first reference point, and is tangent at the second reference point to the front windshield, wherein the arc extends on the rear side of the vehicle body between the first and second reference points. With such deployment-limiting sheet, it is possible to reliably inhibit the air bag from being expanded rearwards of the vehicle body at the initial stage of the deployment.

Although the embodiment of the present invention has been described in detail, it will be understood that various modifications may be made without departing from the subject matter of the present invention.

Figures 10A, 10B, 10C:
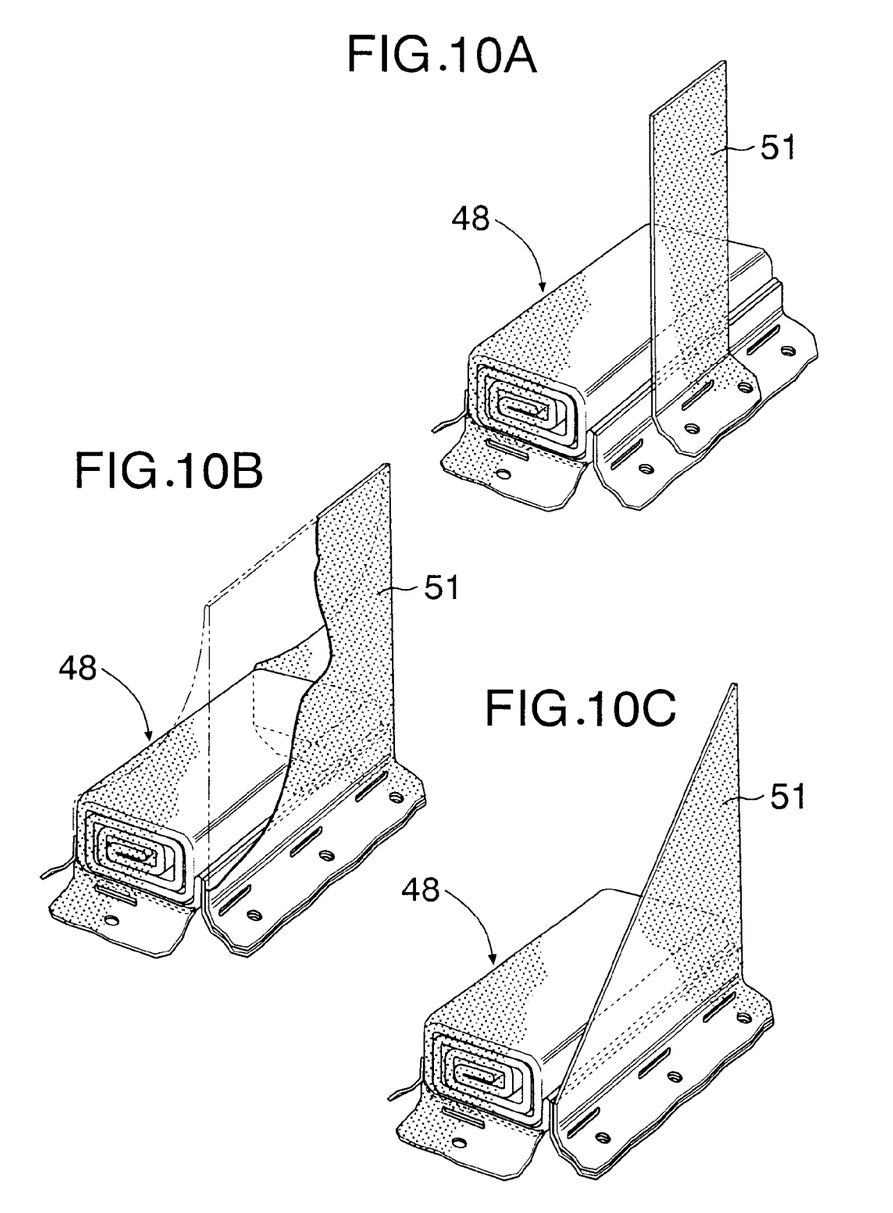
FIGS. 10A, 10B and 10C are views of alternate embodiments of deployment-limiting sheets according to the invention.

For example, the shape of each of the deployment-limiting sheets 24 and 51 is not limited to that in the embodiment and can be modified properly. Alternates embodiments of shapes of deployment-limiting sheets 51 in the air bag Rp for the front passenger's seat are shown in FIGS. 10A, 10B and 10C. The deployment-limiting sheet 51 shown in FIG. 10A is formed having a width smaller than that of the deployment-limiting sheet 51 in the first embodiment. The deployment-limiting sheet 51 shown in FIG. 10B is formed having a larger width on the side of the stationary end and extends with side portions that cover left and right sides of the folded-up air bag 48. The deployment-limiting sheet 51 shown in FIG. 10C is formed into a triangle tapered from the stationary end toward the free end.

Figure 11:
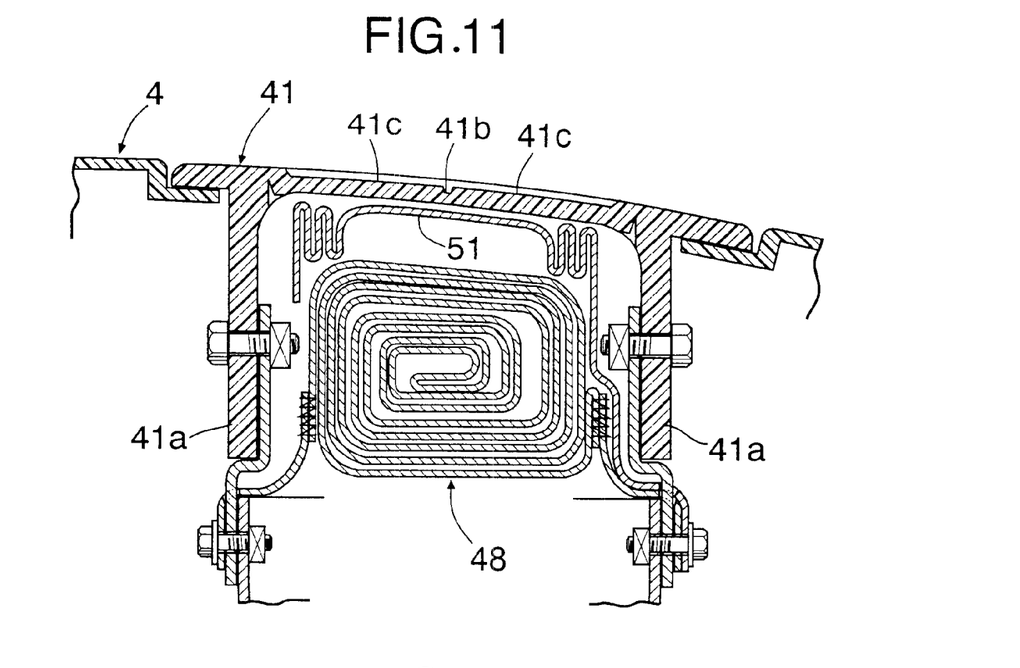
FIG. 11 is a view of another alternate embodiment showing how to fold up a deployment-limiting sheet according to the invention.
Figure 12:
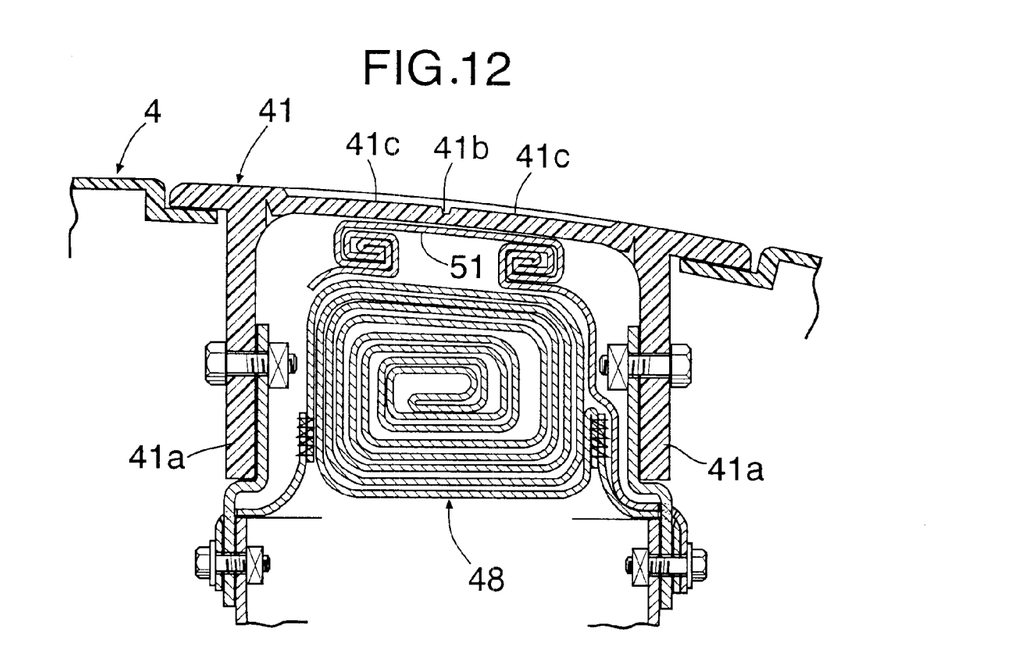
FIG. 12 is a view of a further alternate embodiment showing how to fold up a deployment-limiting sheet according to the invention.

The manner of folding each of the deployment-limiting sheets 24 and 51 is not limited to that in the first embodiment, and can be modified properly. In the first embodiment, the deployment-limiting sheet 51 is folded in the bellows-shape in the longitudinal direction above the rear and front portions of the folded-up air bag 48, while a deployment-limiting sheet 51 in another alternate embodiment shown in FIG. 11 is folded in a bellows-shape in a vertical direction, and a deployment-limiting sheet 51 in a further alternate embodiment shown in FIG. 12 is folded in a volute shape.

The material used for manufacturing each of the deployment-limiting sheets 24 and 51 is not necessarily the same as that used for each of the air bags 21 and 48.

We claim:

1. An air bag device for a vehicle, comprising:
 a folded-up air bag accommodated in a module cover of a steering wheel;
 a peripheral edge of an opening in the air bag being fixed to a retainer supporting an inflator so that when the air bag is expanded by a gas generated by the inflator, the air bag deploys into a vehicle compartment through an opening in a lid provided on the module cover; and
 a deployment-limiting sheet disposed between the folded-up air bag and an inner surface of the module cover and which is longer than a length of an inner periphery of the module cover in a longitudinal direction of the vehicle;
 said deployment-limiting sheet having one end fixed within the steering wheel, and the folded-up air bag being covered on a front side of the vehicle, extending from a rear side of the vehicle, by a free end of said deployment-limiting sheet; and
 said deployment-limiting sheet covering a lower rear portion of said air bag and extending between said air bag and an object to be restrained by the air bag during an initial stage of air bag deployment, such that said air bag deploys primarily upwardly during the initial stage of air bag deployment.

2. An air bag device according to claim 1, wherein said deployment-limiting sheet has one end fixed near said peripheral edge of the opening in the air bag.

3. An air bag device according to claim 2, wherein said deployment-limiting sheet has said one end fixed to said retainer.

4. An air bag device according to claim 1, wherein said deployment-limiting sheet has one end fixed to the air bag device, and an opposite free end which deploys together with the air bag into the vehicle compartment.

5. An air bag device according to claim 1, wherein said deployment-limiting sheet is band-shaped.

6. An air bag device according to claim 1, wherein said deployment-limiting sheet and said air bag are formed from the same material.

7. An air bag device for a vehicle, comprising:

a folded-up air bag accommodated in a retainer disposed within a dash board of the vehicle;

a peripheral edge of an opening in the air bag being fixed to a retainer so that when the air bag is expanded by a gas generated by an inflator supported on the retainer, the air bag deploys into an occupant compartment of the vehicle through an opening in a lid provided on the dash board;

said folded-up air bag being covered on a front side of the vehicle, extending from a rear side of the vehicle, by a deployment-limiting sheet which is disposed between the folded-up air bag and an inner surface of the lid, and which is longer than a reference length;

said reference length being as long as an arc of a circle which has a center immediately above a first reference point at a rear end of the lid, passes through said first reference point, and is tangent at a second reference point to a front windshield of the vehicle, said arc extending on the rear side of the vehicle between said first and second reference points;

said deployment-limiting sheet covering a lower rear portion of said air bag and extending between said air bag and an object to be restrained by the air bag during an initial stage of air bag deployment, such that said air bag deploys primarily upwardly during the initial stage of air bag deployment;

said deployment limiting sheet having a free end and a stationary end, the stationary end being fixed near said retainer at a position rearwardly of said free end in a state in which said deployment-limiting sheet covers said folded-up air bag, and during the initial stage of air bag deployment, a front portion of the air bag is first deployed, and a rear portion of the air bag faced by the stationary end of the deployment-limiting sheet is then deployed, later than the front portion, due to a resisting force received from the deployment-limiting sheet.

8. An air bag device according to claim 7, wherein said deployment-limiting sheet has one end fixed near said peripheral edge of the opening in the air bag.

9. An air bag device according to claim 8, wherein said deployment-limiting sheet has said one end fixed to said retainer.

10. An air bag device according to claim 7, wherein said deployment-limiting sheet has one end fixed to the air bag device, and an opposite free end which deploys together with the air bag into the vehicle compartment.

11. An air bag device according to claim 7, wherein said deployment-limiting sheet is band-shaped.

12. An air bag device according to claim 7, wherein said deployment-limiting sheet and said air bag are formed from the same material.

13. An air bag device for a vehicle, comprising:

a module having a cover;

a folded-up air bag accommodated in said module;

a peripheral edge of an opening in the air bag being fixed to a retainer supporting an inflator so that when the air bag is expanded by a gas generated by the inflator, the air bag deploys into a vehicle compartment through an opening provided on the module cover; and a deployment-limiting sheet disposed between the folded-up air bag and an inner surface of the module cover and which as longer than a length of an inner periphery of the module cover in a longitudinal direction of the vehicle;

said deployment-limiting sheet having one end fixed near said retainer, and the folded-up air bag being covered on a front side of the vehicle, extending from a rear side of the vehicle, by a free end of said deployment-limiting sheet; and said deployment-limiting sheet covering a lower rear portion of said air bag and extending between said air bag and an object to be restrained by the air bag during an initial stage of air bag deployment, such that said air bag deploys primarily upwardly during the initial stage of air bag deployment.

14. An air bag device according to claim 13, wherein said deployment-limiting sheet has one end fixed near said peripheral edge of the opening in the air bag.

15. An air bag device according to claim 14, wherein said deployment-limiting sheet has said one end fixed to said retainer.

16. An air bag device according to claim 13, wherein said deployment-limiting sheet has one end fixed to the air bag device, and an opposite free end which deploys together with the air bag into the vehicle compartment.

17. An air bag device according to claim 13, wherein said deployment-limiting sheet is band-shaped.

18. An air bag device according to claim 13, wherein said deployment-limiting sheet and said air bag are formed from the same material.

19. An air bag device according to claim 1, wherein a longitudinal length of said deployment-limiting sheet is greater than a transverse width of said deployment limiting sheet.

20. An air bag device according to claim 13, wherein a longitudinal length of said deployment-limiting sheet is greater than a transverse width of said deployment limiting sheet.

* * * * *

UNITED STATES PATENT AND TRADEMARK OFFICE
CERTIFICATE OF CORRECTION

PATENT NO.      : 6,474,686 B1
DATED           : November 5, 2002
INVENTOR(S)     : Hitoshi Higuchi et al.

It is certified that error appears in the above-identified patent and that said Letters Patent is hereby corrected as shown below:

Title page,
Item [73], Assignee, change "HOnda" to -- Honda --.

Column 2,
Line 40, change "pointy" to -- point --.

Column 3,
Line 16, after "embodiment" delete the comma.

Column 4,
Line 4, change "cap-shaped" to -- cup-shaped --.

Column 5,
Line 66, after "another" delete the period.

Column 6,
Line 16, change "Alternates" to -- Alternate --.
Line 52, before "disposed" insert -- which is --.
Line 44, change "deployment limiting" to -- deployment-limiting --.

Column 8,
Line 21, change "which as" to -- which is --.
Lines 26-27, change "on a front side of the vehicle, extending from a rear side of the vehicle," to -- from a rear side of the vehicle to a front side of the vehicle --.
Line 52, change "deployment limiting" to -- deployment-limiting --.
Line 56, change "deployment limiting" to -- deployment-limiting --.

Signed and Sealed this

Fifteenth Day of April, 2003

JAMES E. ROGAN
*Director of the United States Patent and Trademark Office*

UNITED STATES PATENT AND TRADEMARK OFFICE
CERTIFICATE OF CORRECTION

| | | |
|---|---|---|
| PATENT NO. | : 6,474,686 B1 | |
| APPLICATION NO. | : 09/859890 | |
| DATED | : November 5, 2002 | |
| INVENTOR(S) | : Hitoshi Higuchi et al. | |

It is certified that error appears in the above-identified patent and that said Letters Patent is hereby corrected as shown below:

<u>Title page,</u>
Item [73], Assignee, change "HOnda" to -- Honda --.

<u>Column 2,</u>
Line 40, change "pointy" to -- point --.

<u>Column 3,</u>
Line 16, after "embodiment" delete the comma.

<u>Column 4,</u>
Line 4, change "cap-shaped" to -- cup-shaped --.

<u>Column 5,</u>
Line 66, after "another" delete the period

<u>Column 6,</u>
Line 16, change "Alternates" to -- Alternate --.
Line 52, before "disposed" insert -- which is --.
Lines 59-60, change "on a front side of the vehicle, extending from a rear side of the vehicle" to -- from a rear side of the vehicle to a front side of the vehicle --.

<u>Column 7,</u>
Line 44, change "deployment limiting" to -- deployment-limiting --.
Lines 25-26, change "on a front side of the vehicle, extending from a rear side of the vehicle," to -- from a rear side of the vehicle to a front side of the vehicle --.

<u>Column 8,</u>
Line 21, change "which as" to -- which is --.
Lines 26-27, change "on a front side of the vehicle, extending from a rear side of the vehicle," to -- from a rear side of the vehicle to a front side of the vehicle --.

UNITED STATES PATENT AND TRADEMARK OFFICE
CERTIFICATE OF CORRECTION

PATENT NO. : 6,474,686 B1
APPLICATION NO. : 09/859890
DATED : November 5, 2002
INVENTOR(S) : Hitoshi Higuchi et al.

It is certified that error appears in the above-identified patent and that said Letters Patent is hereby corrected as shown below:

<u>Column 8 (cont'd),</u>
Line 52, change "deployment limiting" to -- deployment-limiting --.
Line 56, change "deployment limiting" to -- deployment-limiting --.

This certificate supersedes Certificate of Correction issued April 15, 2003.

Signed and Sealed this

Twenty-fourth Day of July, 2007

JON W. DUDAS
*Director of the United States Patent and Trademark Office*